Patented Dec. 12, 1933

1,939,244

UNITED STATES PATENT OFFICE 1,939,244

PROCESS FOR RENDERING CELLULOSE MATERIALS TRANSLUCENT

Charles S. Webber, Springfield, Mass., and Cyril J. Staud, Rochester, N. Y., assignors to Eastman Kodak Company, Rochester, N. Y., a corporation of New York No Drawing. Application December 14, 1929
Serial No. 414,212

9 Claims. (Cl. 18—54)

This invention relates to a process for the preparation of translucent materials and particularly to the treatment of cellulosic material in sheet form to render it translucent.

The manufacture of cellulosic materials into thread, sheet or other form is generally so conducted that the product obtained is as clear and translucent as it is possible to make it. There are numerous uses, however, for the employment of such products which are opaque or at least translucent. For example, in the photographic industry such products are now used in the preparation of artistic portraits which may be used as transparencies, and, when treated by a skilled artist in this work, the translucent film surface may be viewed by reflected or transmitted light with very pleasing results. Such surfaces may likewise be used in the same industry for retouching or in the manufacture of the view windows for photographic cameras, for tracing paper as used in mechanical drawing and for many other allied purposes. In the rayon and textile industries the employment of translucent threads which may be produced by the hereinafter described process give unusually pleasing and novel artificial fibers for textile products.

An object of our invention is to provide a process whereby organophile cellulosic products may be so treated that they are rendered translucent. Another object of this invention provides a method by which cellulosic products may be treated in solvent and non-solvent baths in such a manner that the product is rendered translucent. Other objects will hereinafter appear.

We have found that if the various cellulose products, whether in sheet, filament or other form, are treated with a solvent bath and subsequently acted on by a non-solvent bath, the product will be rendered translucent. By the treatment of cellulose acetate or cellulose nitrate materials in this manner, products for many industrial uses and which have a very good and uniform transparency may be manufactured. By regulation of the treatment sheets or other products varying from transparent to a density bordering on opacity may result.

In carrying out this process any of the usual solvents for the respective cellulose products may be utilized, for example, if cellulose acetate sheets or threads or other products are being treated, a solvent bath of acetone, methyl acetate, 1–4 dioxan mixtures of ethylene chloride-alcohol, chloroform-alcohol, or tetrachlorethane, diacetone alcohol, pyridine, meta-cresols, aniline, methyl ether of ethylene glycol mono-acetate, are particularly suited as solvents for the acetone soluble cellulose ester; if the chloroform soluble cellulose acetate be so treated with chloroform or alcohol-chloroform or any of the solvents of such an acetate it will give the desired effect. If a cellulose nitrate film or other product is being treated, we have found that a 50—50 mixture of methanol and acetone will give excellent results, but, as in the case of cellulose acetate, there are numerous solvents of the cellulose nitrate that may likewise be used.

After immersing the cellulose derivative in one of the above described baths or their equivalents, the so treated cellulose derivative is subjected to a second bath which has no solvent effect upon it. According to the type of cellulose derivative being treated a non-solvent is selected which has little or no solvent action upon the cellulose product being processed. It is not necessary for us here to list all of the non-solvents for the various derivatives that may be treated by our process but it suffices to say that cellulose acetate may be treated in a bath composed of such non-solvents as ethanol, methanol, ether, benzol, carbon tetrachloride, ethylene chloride, etc., while if cellulose nitrate is being processed, an ether or ethanol bath may be cited as good examples of non-solvents which work very satisfactorily in imparting translucency and coagulate the surface treated cellulose product.

In the preparation of translucent films or filaments or similar products of cellulose nitrate we have found that if this ester be treated first in acetone and then in methanol or the reverse and the thus treated product be dried in air or by a vacuum drying process, the subsequent solvent bath treatment is not absolutely necessary. We have found, however, that while the air drying or vacuum drying of the cellulose nitrate will result in a translucent material it is not ordinarily particularly uniform and it is therefore generally desirable to pass the acetone-methanol treated product in a similar manner into a non-solvent bath as described above.

If the material being treated be in sheet or filament form, the immersion of this material into a solvent bath will at times be too drastic in that the solvent will etch too deeply or may even completely dissolve the so-treated material. It is generally advisable, therefore, to have present in the solvent bath a compatible non-solvent in such proportion that the drastic action of the solvent be modified. For example, if a cellulose acetate is being treated in an acetone solution, water may be added thereto in such quantities that the attack of the acetone upon the cellulose acetate will be just sufficient to dissolve the surface of the cellulose to the desired depth. The degree of translucence will be governed in most instances by the extent of the action of the solvent in the first bath. The greater the action on the cellulose the greater the translucence and the less the action of the solvent bath, the more transparent the product which will result.

There are many ways in which this process may be carried out by simple immersion of the cellulose film or filament or other product first into the solvent and then, after sufficient action thereon by the solvent, the product is immersed in a non-solvent bath. For example, a cellulose acetate film may be drawn through a bath composed of acetone, it being allowed to remain in the bath for 30 seconds and after this first treatment passed through a non-solvent bath such as carbon tetrachloride or xylene for one or more minutes prior to the final drying of the sheet. In the treatment of cellulose nitrate support, which is to be ultimately used for the preparation of portrait or other products, the support may first be immersed in the acetone solution and then in a methanol solution, or in the reverse order, and finally in a 50% aqueous ethanol mixture or, for that matter, in a 95% ethanol. It will be obvious that the number of solvent and non-solvent baths that may be used for our process are legend. An expert in this art will call to mind many equivalents of the solvent or non-solvent bath that may be used and with almost, if not always, equally good results, it being necessary merely that the surface of the cellulose derivative, in whatever form it may be used, be softened or placed in superficial solution without being actually washed away or dissolved off and then later congealed or precipitated by the non-solvent or other treatment to cast the surface in the translucent or opaque form which it is in as a result of the softening or dissolving action of the solvent.

There are numerous types of apparatus in commercial use for the treatment of cellulosic materials in continuous or discontinuous form that can be readily used for this purpose, the product may be drawn through, immersed in or sprayed with the solvent or the non-solvent baths or any other method of application or treatment for the preparation of our translucent organophile cellulose products may be employed.

It will be evident from the above disclosure that any type of cellulose derivative product may be treated in a suitable solvent with or without the presence therein of a solvent inhibitor and subsequently treated in any suitable non-solvent bath in any manner similar to those above described without in any way departing from this invention or sacrificing the advantages that may be derived from its use.

What we claim as our invention and desire to be secured by Letters Patent of the United States is:

1. A process for the manufacture of a translucent cellulose acetate product which comprises subjecting the product first to superficial action of acetone and then to the action of benzene.

2. A process for the manufacture of a translucent cellulose acetate product which comprises subjecting the product to the action of a 50% ethanol—50% acetone bath and subsequently to a benzene bath.

3. A process for the manufacture of translucent cellulose nitrate products which comprises subjecting the product to a 50% methanol—50% acetone bath and then to the action of an ethanol bath.

4. A process for the manufacture of a translucent product of organophile cellulose material which comprises partially dissolving the surface of the material by subjecting it to superficial action of a solvent therefor and then rendering the partially dissolved material translucent by subjecting it to the action of a non-solvent coagulating bath.

5. A process for the manufacture of a translucent sheet of organophile cellulose material which comprises partially dissolving the surface of the material by subjecting it to superficial action of a solvent therefor and then rendering the partially dissolved material translucent by subjecting it to the action of a non-solvent coagulating bath.

6. A process for the manufacture of a translucent product of cellulose acetate which comprises partially dissolving the surface of the material by subjecting it to the action of a solvent therefor and then rendering the partially dissolved material translucent by subjecting it to the action of a non-solvent coagulating bath.

7. A process for the manufacture of a translucent sheet of cellulose acetate which comprises partially dissolving the surface of the cellulose acetate by subjecting it to superficial action of a solvent therefor and then rendering the partially dissolved material translucent by subjecting it to the action of a non-solvent coagulating bath.

8. A process for the manufacture of a translucent product of organophile cellulose material which comprises partially dissolving the surface of the material by subjecting it to superficial action of a solvent therefor containing a non-solvent to control the penetration of the solvent and then rendering the partially dissolved material translucent by subjecting it to the action of a non-solvent coagulating bath.

9. A process for the manufacture of a translucent sheet of cellulose nitrate which comprises dissolving the surface of the cellulose nitrate by subjecting it to the action of a solvent therefor and then rendering the partially dissolved material translucent by subjecting it to the action of a non-solvent coagulating bath.

CHARLES S. WEBBER.
CYRIL J. STAUD.